United States Patent
Sasakawa (10) Patent No.: US 11,946,455 B2
(45) Date of Patent: Apr. 2, 2024

(54) WIND ENERGY GENERATION SYSTEM

(71) Applicant: Electric Power Development Co., Ltd., Tokyo (JP)

(72) Inventor: Takeshi Sasakawa, Tokyo (JP)

(73) Assignee: ELECTRIC POWER DEVELOPMENT CO., LTD., Tokyo (JP)

( * ) Notice: Subject to any disclaimer, the term of this patent is extended or adjusted under 35 U.S.C. 154(b) by 23 days.

(21) Appl. No.: 17/757,883

(22) PCT Filed: Dec. 22, 2020

(86) PCT No.: PCT/JP2020/047918
§ 371 (c)(1),
(2) Date: Jun. 22, 2022

(87) PCT Pub. No.: WO2021/132233
PCT Pub. Date: Jul. 1, 2021

(65) Prior Publication Data
US 2023/0025617 A1 Jan. 26, 2023

(30) Foreign Application Priority Data
Dec. 25, 2019 (JP) ................................. 2019-234796

(51) Int. Cl.
*F03D 80/80* (2016.01)
*F03D 80/70* (2016.01)

(52) U.S. Cl.
CPC ............. *F03D 80/80* (2016.05); *F03D 80/70* (2016.05)

(58) Field of Classification Search
CPC . F03D 80/80; F03D 80/70; F03D 1/00; F03D 1/0691; F05B 2240/14; Y02E 10/72
See application file for complete search history.

(56) References Cited

U.S. PATENT DOCUMENTS

| 8,786,124 B2 * | 7/2014 | Castell Martinez | ...... F03D 9/25 290/55 |
| 8,981,587 B2 * | 3/2015 | Castell Martinez | .... F03D 15/00 290/55 |

(Continued)

FOREIGN PATENT DOCUMENTS

| AU | 2020411793 A1 * | 7/2022 | ............. F03D 80/00 |
| GB | 2605898 A * | 10/2022 | ............. F03D 80/00 |

(Continued)

OTHER PUBLICATIONS

International Search Report dated Mar. 9, 2021 in PCT/JP2020/047918.

(Continued)

*Primary Examiner* — Pedro J Cuevas
(74) *Attorney, Agent, or Firm* — Knobbe, Martens, Olson & Bear LLP (57) ABSTRACT

A wind energy generation system includes a tower, a nacelle provided in an upper portion of the tower to be rotatable around a central axis of the tower, a hub provided in front of the nacelle to be rotatable around an axis orthogonal to the central axis, and one or more blades provided in the hub. The hub includes a hub body portion to which the blades are attached, and a fitting protruding portion that protrudes from a back surface side of the hub body portion. A fitting portion having an opening portion is provided in front of the nacelle, and the fitting protruding portion is fitted into the fitting portion from the opening portion. In the wind energy generation system, outflow of oil to the outside of the generation system can be inhibited.

4 Claims, 6 Drawing Sheets

(56) References Cited

U.S. PATENT DOCUMENTS

| | | | | |
|---|---|---|---|---|
| 11,415,113 B2 * | 8/2022 | Soler | ................ | F03D 80/70 |
| 2006/0152014 A1 * | 7/2006 | Grant | ................ | F03D 15/20 |
| | | | | 290/55 |
| 2009/0243301 A1 * | 10/2009 | Longtin | ................ | H02K 7/1838 |
| | | | | 290/55 |
| 2010/0032961 A1 | 2/2010 | Numajiri | | |
| 2012/0315129 A1 * | 12/2012 | Castell Martinez | .... | F03D 15/00 |
| | | | | 415/122.1 |
| 2014/0312625 A1 * | 10/2014 | Castell Martinez | .... | F03D 15/20 |
| | | | | 290/55 |
| 2018/0313338 A1 * | 11/2018 | Soler | ................ | F03D 80/70 |
| 2022/0154687 A1 * | 5/2022 | Schüller | ................ | F03D 80/70 |
| 2023/0036819 A1 * | 2/2023 | Sasakawa | ................ | F03D 80/70 |
| 2023/0107092 A1 * | 4/2023 | Jain | ................ | G01N 21/95 |
| | | | | 382/103 |

FOREIGN PATENT DOCUMENTS

| | | | | | |
|---|---|---|---|---|---|
| GB | 2606646 A | * | 11/2022 | ............ | F03D 80/00 |
| JP | A 2006-506577 | | 2/2006 | | |
| JP | A 2015-140655 | | 8/2015 | | |
| JP | A 2015-148154 | | 8/2015 | | |
| JP | A 2015-222070 | | 12/2015 | | |
| JP | 6771118 B1 | * | 10/2020 | | |
| JP | 2021102948 A | * | 7/2021 | ............ | F03D 80/00 |
| JP | 2021102949 A | * | 7/2021 | ............ | F03D 80/00 |
| JP | 2021102958 A | * | 7/2021 | ............ | Y02E 10/72 |
| WO | WO 2004/046582 A2 | | 6/2004 | | |
| WO | WO 2009/054152 A1 | | 4/2009 | | |
| WO | WO 2013/042251 A1 | | 3/2013 | | |
| WO | WO 2016/125099 A1 | | 8/2016 | | |
| WO | WO-2021132233 A1 | * | 7/2021 | ............ | F03D 80/00 |
| WO | WO-2021132244 A1 | * | 7/2021 | ............ | F03D 80/00 |

OTHER PUBLICATIONS

Office Action dated Mar. 17, 2020 in JP Application No. 2019-234796.

* cited by examiner

WIND ENERGY GENERATION SYSTEM

PRIORITY AND CROSS REFERENCE TO RELATED APPLICATIONS

This application is the U.S. National Stage Application under 35 U.S.C. § 371 of International Application No. PCT/JP2020/047918, filed Dec. 22, 2020, designating the U.S. and published as WO 2021/132233 A1 on Jul. 1, 2021, which claims the benefit of Japanese Patent Application No. JP 2019-234796, filed Dec. 25, 2019. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present invention relates to a wind energy generation system.

Priority is claimed on Japanese Patent Application No. 2019-234796, filed Dec. 25, 2019, the content of which is incorporated herein by reference.

BACKGROUND ART

Development of solar power generation and wind power generation have been promoted toward the purpose of using renewable energy as main power sources. Among them, development of wind power generation is expected to be accelerated while its development area is shifted from land to offshore. Since offshore wind power generation is operated in a harsh natural environment and access thereto is difficult, it is required to operate and maintain wind energy generation systems reasonably and efficiently.

Controlling outflow of oil is especially important in operation and maintenance of wind energy generation systems. In wind energy generation systems, operating oil for hydraulic operation of blades, lubricating oil for speed increasers, insulating oil for oil-immersed transformers, and the like are used in hubs and nacelles. Offshore wind power generation tends to have larger devices and uses a large amount of oil. In a case in which devices are damaged and oil leaks, there is a problem that oil will pollute the environment when it leaks out of wind energy generation systems, and it is also difficult to recover oil at sea.

Patent Literature 1 discloses a technique in which, as a mechanism for inhibiting outflow of oil, a sealing member is provided to close a gap between a nacelle cover included in a nacelle and a tower, a seal cover is disposed on an upper side thereof, and an oil storage portion is provided at a position lower than the seal cover. Patent Literature 2 discloses a technique in which a receiving portion that receives leaked oil or solid debris from devices supported by a stationary portion including a support shaft which extends along a rotational center axis of a hub to penetrate a hub is provided to be supported by a rotating portion that is configured to be rotatable and includes the hub.

CITATION LIST

Patent Literature

[Patent Document 1]
Japanese Unexamined Patent Application, First publication No. 2015-222070

[Patent Document 2]
Japanese Unexamined Patent Application. First publication No. 2015-140655

SUMMARY OF INVENTION

Technical Problem

However, with a mechanism such as Patent Documents 1 and 2, it is difficult to sufficiently inhibit the problem that, in a case in which oil leaks from devices that use oil, the oil flows out from a gap between a nacelle and a tower.

An object of the present invention is to provide a wind energy generation system in which outflow of oil to the outside of the generation system can be inhibited.

Solution to Problem

The present invention has the following aspects.

[1] A wind energy generation system including: a tower; a nacelle provided in an upper portion of the tower to be rotatable around a central axis of the tower; a hub provided in front of the nacelle to be rotatable around an axis orthogonal to the central axis; and one or more blades provided in the hub, wherein the hub includes a hub body portion to which the blades are attached, and a fitting protruding portion that protrudes from a back surface side of the hub body portion, a fitting portion having an opening portion is provided in front of the nacelle, and the fitting protruding portion is fitted into the fitting portion from the opening portion.

[2] The wind energy generation system according to [1], wherein the fitting portion in a bottom portion of the nacelle includes a tip portion that extends horizontally from the opening portion to the back surface side, and an inclined portion that extends from a rear end of the tip portion and has a height lower than the tip portion, and a boundary between the tip portion and the inclined portion is located closer to the hub body portion side than a tip of the fitting protruding portion on the back surface side.

[3] The wind energy generation system according to [1] or [2], wherein an inclined portion whose height decreases as it separates from the opening portion is provided near a tip portion of the fitting portion in a bottom portion of the nacelle.

[4] The wind energy generation system according to [1], wherein one or more weir portions formed in protrusion shapes, which rise from a tip portion of the fitting portion in a bottom portion of the nacelle and extend in a circumferential direction of the opening portion are provided in the fitting portion.

[5] The wind energy generation system according to [1], wherein a cylindrical hub fitting member is fitted to the back surface side of the hub body portion to form the fitting protruding portion, a cylindrical nacelle fitting member is fitted into the fitting portion along the opening portion, and the fitting protruding portion fitted into the fitting portion from the opening portion is inserted into the nacelle fitting member.

Advantageous Effects of Invention

According to the present invention, it is possible to provide a wind energy generation system in which outflow of oil to the outside of the generation system can be inhibited.

DESCRIPTION OF EMBODIMENTS

Hereinafter, an example of a wind energy generation system of the present invention will be described with reference to the figures. Also, dimensions and the like of the figures exemplified in the following description are examples, and the present invention is not necessarily limited thereto and can be appropriately modified and carried out without changing the gist thereof.

First Embodiment

Figure 1:
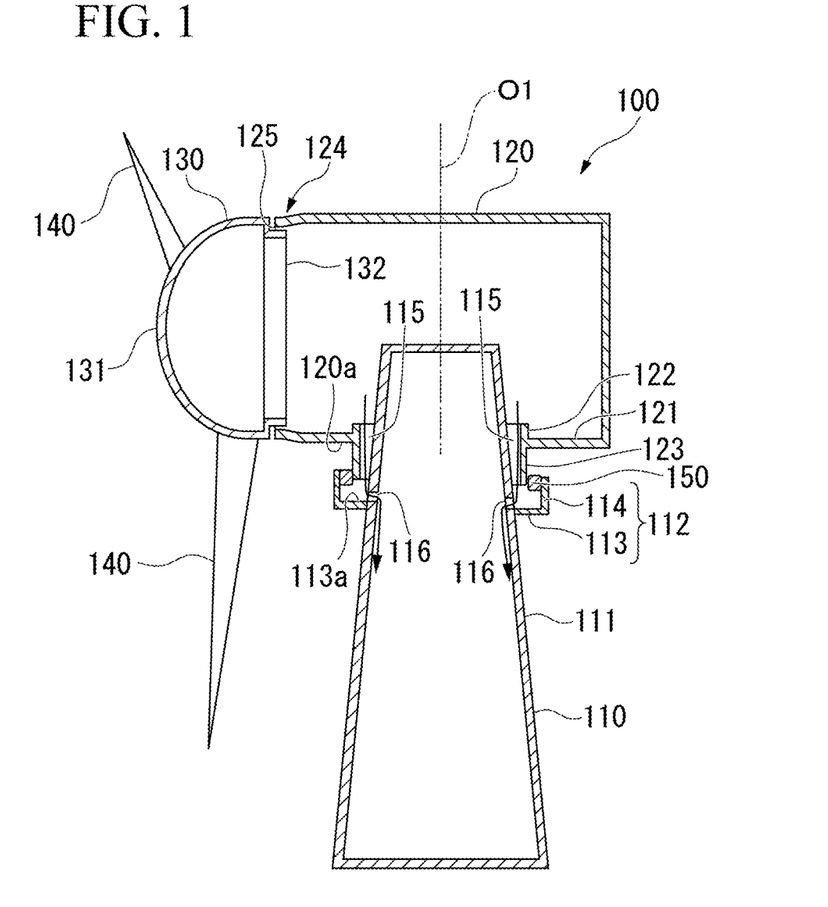
FIG. 1 is a cross-sectional view showing a schematic configuration of a wind energy generation system according to an embodiment of the present invention.

As shown in FIG. 1, a wind energy generation system 100 of the present embodiment includes a tower 110, a nacelle 120, a hub 130, and one or more blades 140. The nacelle 120 is provided in an upper portion of the tower 110 to be rotatable around a central axis O1 of the tower 110. The hub 130 is provided in front of the nacelle 120 to be rotatable around an axis orthogonal to the central axis O1. The hub 130 is provided with one or more blades 140.

The central axis O1 of the tower 110 coincides with a vertical direction.

The wind energy generation system 100 includes a generator (not shown) inside the hub 130 and the nacelle 120, which is configured to generate electric power using rotational energy of the blades 140 and hub 130. The generator is not particularly limited, and a known generator can be adopted. For the generator, a hydraulic transmission may be used, or a gear type speed increaser may be used.

The tower 110 is provided to stand on land or offshore. In the wind energy generation system 100, by rotating the nacelle 120 in the upper portion of the tower 110, the front hub 130 provided with the blades 140 can be turned upwind. When the blades 140 receive wind, the hub 130 rotates together with the blades 140, and electric power is generated due to the rotational energy thereof in the generator.

The number of the blades 140 attached to the hub 130 is not particularly limited and may be, for example, three. In a case in which a plurality of blades 140 are attached to the hub 130, the plurality of blades 140 are preferably radially attached at equal intervals when the hub 130 is viewed in a front view.

Shapes and dimensions of the blades 140 are not particularly limited and can be appropriately set.

Figure 8:
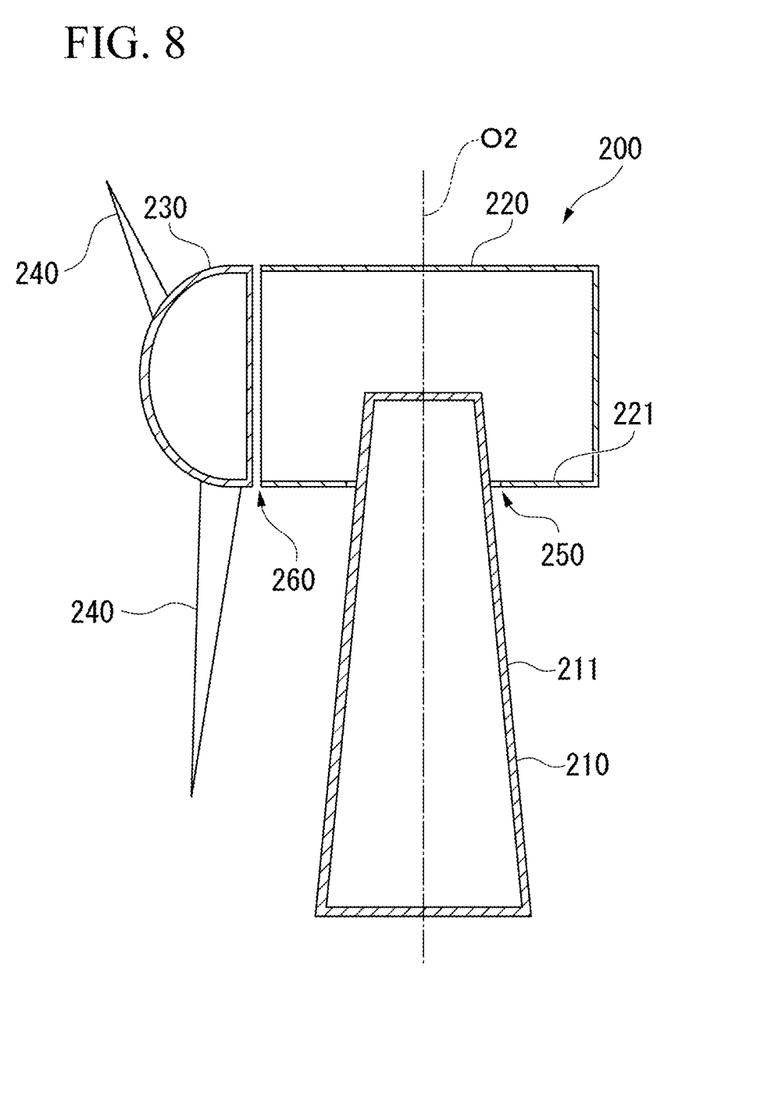
FIG. 8 is a cross-sectional view showing a schematic configuration of a conventional wind energy generation system.

As shown in FIG. 8, in a conventional wind energy generation system 200, since a hub 230 is rotatably provided in front of a nacelle 220, a gap 260 is structurally formed at a connection portion between the hub 230 and the nacelle 220. Further, in the hub 230, a hydraulic operation mechanism using an accumulator is usually provided in order to urgently close blades in a case in which a blade operation mechanism fails, or the like. For that reason, in the hub 230, oil may leak due to damage to devices or the like, and the oil may flow out of the generation system through the gap 260 between the hub 230 and the nacelle 220 and pollute the environment. In addition, it is difficult to recover the oil that has flowed out of the wind energy generation system 200.

For this reason, in the wind energy generation system 100, it is also important that a connection structure between the hub 130 and the nacelle 120 is formed to be a structure in which oil leaked from devices in the hub 130 does not flow out of the generation system.

Figure 3:
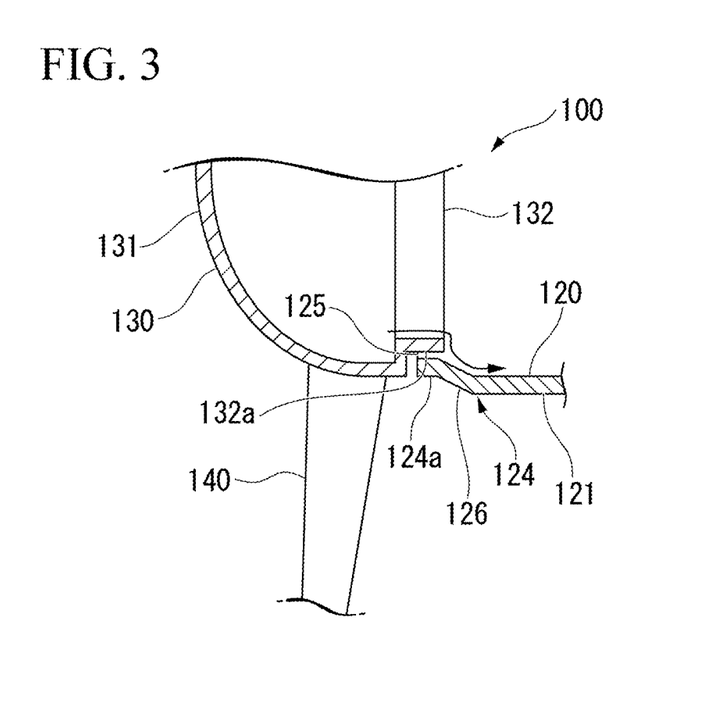
FIG. 3 is a cross-sectional view showing a connection structure between a hub and the nacelle of the wind energy generation system of FIG. 1.

As shown in FIGS. 1 and 3, the hub 130 of the present embodiment includes a hemispherical hub body portion 131 to which one or more blades 140 are attached, and a cylindrical fitting protruding portion 132 that protrudes from a back surface side of the hub body portion 131. A side of the fitting protruding portion 132 opposite to the hub body portion 131 is open.

A fitting portion 124 for fitting the fitting protruding portion 132 of the hub 130 is provided on a front side of the nacelle 120. An opening portion 125 that is open in a circular shape is formed on a front surface of the fitting portion 124. The fitting protruding portion 132 of the hub 130 is fitted into the fitting portion 124 through the opening portion 125 of the nacelle 120, and thus the hub 130 is rotatably connected to the front side of the nacelle 120.

In the present embodiment, the fitting protruding portion 132 of the hub 130 is configured to be fitted into the fitting portion 124 of the nacelle 120, and thus in a lower portion of the connection portion between the nacelle 120 and the hub 130, a tip portion 132a of the fitting protruding portion 132 is located above a tip portion 124a of the fitting portion 124. Thus, even if the oil leaks from the devices in the hub 130, the oil flows through the fitting protruding portion 132 into the nacelle 120, and thus outflow of the oil to the outside of the generation system from the gap between the hub 130 and the nacelle 120 is inhibited. In this way, in the present embodiment, it is possible to inhibit the environment from being polluted by outflow of the oil to the outside of the generation system. Also, since there is no need to recover the oil that has flowed out of the generation system, the wind energy generation system 100 is particularly advantageous for offshore wind power generation.

In this example, the fitting portion 124 in a bottom portion 121 of the nacelle 129 includes a tip portion 124a that extends horizontally from the opening portion 125 to the back surface side, and an inclined portion 126 that extends from a rear end of the tip portion 124a and has a lower height than the tip portion 124a. That is, the inclined portion 126 whose height decreases as it separates from the front opening portion 125 is provided near the tip portion 124a of the fitting portion 124 in the bottom portion 121 of the nacelle 120. Further, a boundary between the tip portion 124a of the fitting portion 124 and the inclined portion 126 in the bottom portion 121 of the nacelle 120 is located closer to the hub body portion 131 than a tip of the fitting protruding portion 132 of the hub 130 on the back surface side. That is, the tip of the fitting protruding portion 132 of the hub 130 on the back surface side is located backward from the boundary between the tip portion 124a of the fitting portion 124 and the inclined portion 126 in the bottom portion 121 of the nacelle 120. Since such an inclined portion 126 is provided, in a case in which the oil flows from the hub 130 into the nacelle 120, backflow of the oil to the opening portion 125 side of the nacelle 120 is thus inhibited. For that reason, outflow of the oil from the gap between the hub 130 and the nacelle 120 can be more stably inhibited.

Figure 4:
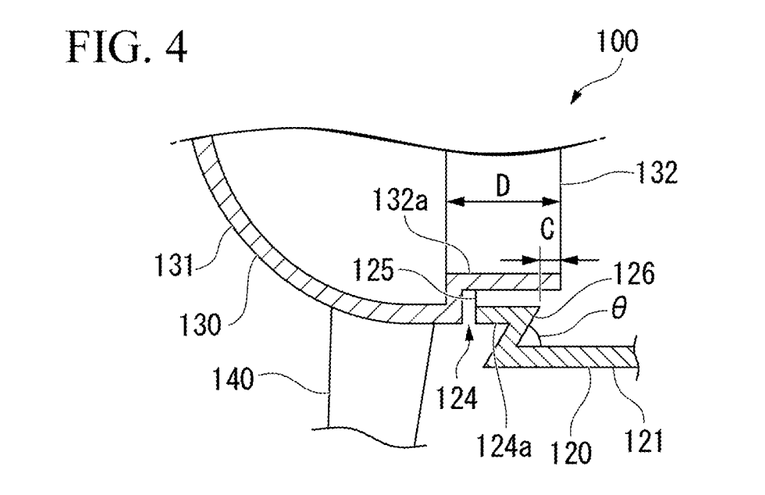
FIG. 4 is an enlarged cross-sectional view of a connection portion between a hub and a nacelle according to another embodiment of the present invention.

As shown in FIG. 4, the inclined portion 126 of the nacelle 120 may be formed to bend backwards when the front opening portion 125 is viewed from an inside of the nacelle 120.

An inclination angle and a height of the inclined portion 126 may be appropriately set from the viewpoint of inhibiting outflow of the oil from the gap between the hub 130 and the nacelle 120. For example, an inclination angle θ (FIG. 4) of an upper surface of the inclined portion 126 with respect to an upper surface of the bottom portion 121 of the nacelle 120 on a back surface side of the inclined portion 126 can be set to 30° or more and 120° or less. Also, a step may be provided by setting the inclination angle θ of the inclined portion 126 to 90°.

A horizontal distance between the tip of the fitting protruding portion 132 of the hub 130 on the back surface side and the boundary between the tip portion 124a of the fitting portion 124 and the inclined portion 126 in the bottom portion 121 of the nacelle 120 is defined as C (m). Further, a length of the tip portion 132a of the fitting protruding portion 132 of the hub 130 is defined as D (m). In this case, a ratio of C to D can be, for example, 10% or more and 50% or less.

From the viewpoint of easily inhibiting outflow of the oil from the gap between the hub 130 and the nacelle 120, a position of a bottom of the opening portion 125 of the fitting portion 124 in the vertical direction is preferably a position higher than an upper end of an upper tubular portion 122 which will be described below.

As shown in FIG. 8, in the conventional wind energy generation system 200, the nacelle 220 is rotatably provided around a central axis O2 to be fitted to an upper portion of a tower 210, and a gap 250 is formed between an outer wall 211 of the tower 210 and a bottom portion 221 of the nacelle 220. In this way, in a connection portion between the upper portion of the tower 210 and the nacelle 220, functionally, there is the gap 250 between the outer wall 211 of the tower 210 and the nacelle 220. In a state in which there is such a gap 250, in a case in which oil leaks from devices that use the oil in the nacelle 220, the oil may flow out of the generation system through the gap 250 between the tower 210 and the nacelle 220 and pollute the environment. In addition, it is difficult to recover the oil that has flowed out of the wind energy generation system 200.

Figure 2:
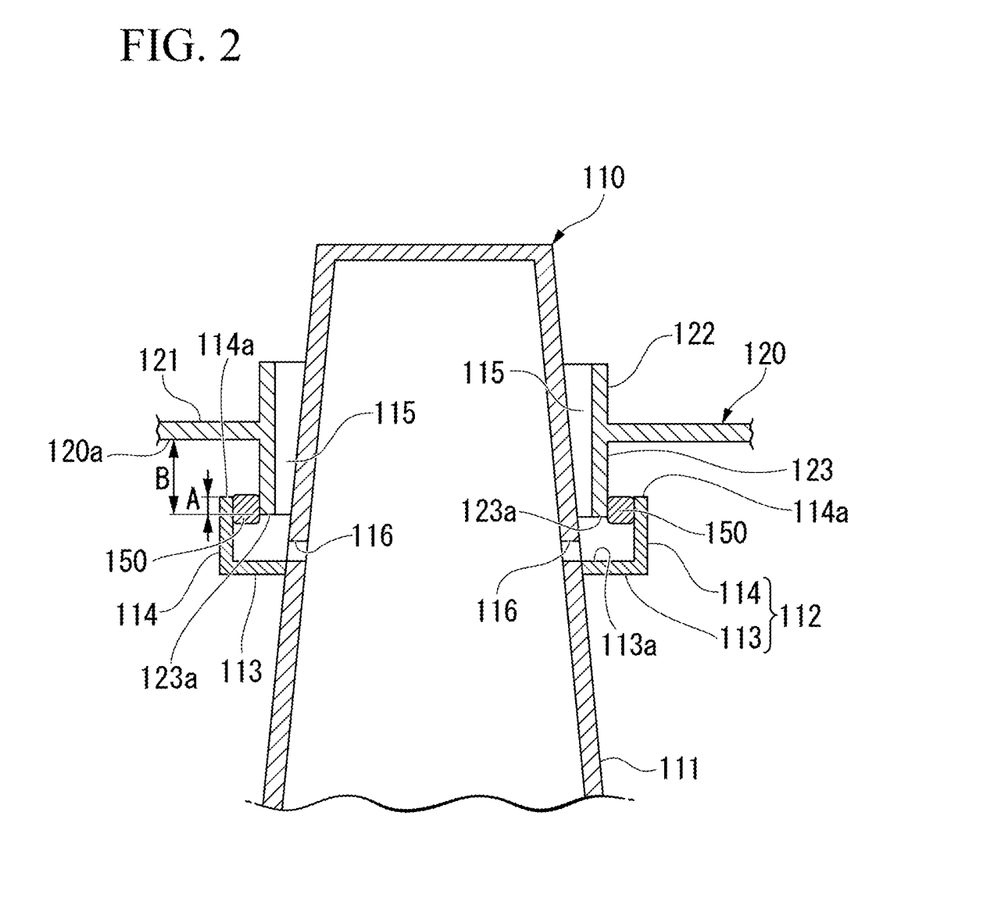
FIG. 2 is an enlarged cross-sectional view of the vicinity of a connection portion between a tower and a nacelle of the wind energy generation system of FIG. 1.

Also in the wind energy generation system 100, as shown in FIGS. 1 and 2, the nacelle 120 has a structure in which it is fitted to the upper portion of the tower 110 to be rotatable around the central axis O1, and a gap 115 is formed between an outer wall 111 of the tower 110 and the nacelle 120. However, in the wind energy generation system 100, an oil receiving portion 112 provided to protrude outward from the outer wall 111 below the nacelle 120 in the outer wall 111 of the tower 110 and encircle the outer wall 111 around the central axis O1 is provided.

The oil receiving portion 112 is provided to encircle the outer wall 111 around the central axis O1 over the entire circumference thereof and includes a plate-shaped protruding portion 113 that protrudes outward from the outer wall 111, and a tubular side wall portion 114 that rises upward from a tip portion of the protruding portion 113 on a side opposite to the outer wall 111. In this way, the oil receiving portion 112 has a gutter shape that encircles the outer wall 111.

In the wind energy generation system 100, since the oil receiving portion 112 is provided on the outer wall 111 of the tower 110, the oil receiving portion 112 can receive the oil that has flowed out of the nacelle 120 from the gap 115 between the tower 110 and the nacelle 120.

Also, in the wind energy generation system 100, one or more opening portions 116 for guiding the oil received in the oil receiving portion 112 into the tower 110 are provided at a portion of the outer wall 111 of the tower 110 at which the oil receiving portion 112 is provided. Thus, since the oil received by the oil receiving portion 112 is guided from the opening portion 116 into the tower 110, outflow of the oil to the outside of the wind energy generation system 100 to the outside of the generation system is inhibited. Even if a large amount of oil leaks in the hub 130, the oil that has flowed into the nacelle 120 from the hub 130 flows out of the nacelle 120 through the gap 115 between the tower 110 and the nacelle 120, is received by the oil receiving portion 112, and is guided from the opening portion 116 into the tower 110.

It is preferable that a position of a lower end of the opening portion 116 in the vertical direction coincide with an upper surface 113a of the protruding portion 113 of the oil receiving portion 112 or is inclined inward. This makes it easy to guide the oil received by the oil receiving portion 112 into the tower 110.

In the wind energy generation system 100, a plurality of opening portions 116 are preferably provided at intervals around the central axis O1 at the portion of the oil receiving portion 112 on the outer wall 111 of the tower 110. Thus, the oil received by the oil receiving portion 112 can be efficiently guided into the tower 110 while a strength of the tower 110 is maintained.

In a case in which a plurality of opening portions 116 are provided on the outer wall 111 of the tower 110, the plurality of opening portions 116 are preferably disposed at equal angular intervals around the central axis O1.

Also, the number of the opening portions 116 provided on the outer wall 111 of the tower 110 may be one.

Shapes of the opening portions 116 are not particularly limited and, for example, rectangular shapes or circular shapes can be exemplified.

The number of the opening portions 116 provided at the portion of the oil receiving portion 112 on the outer wall 111 of the tower 110 can be appropriately set in consideration of ensuring the strength of the tower 110, an amount or a rate of oil leakage assumed in a case in which devices are damaged, and an efficiency of introduction of oil into the tower 110. The number of the opening portions 116 varies depending on an opening area of each opening portion 116, and can be, for example, 4 or more and X or less. This is provided that X is the maximum number of the opening portions 116 that can be formed in a case in which the opening portions 116 are formed around the central axis O1 at intervals of $1m$ at the portion at which the oil receiving portion 112 of the tower 110 is formed. When a radius of an outer circumferential edge of the tower 110 in the case of cutting the portion of the tower 110 in which the oil receiving portion 112 is formed in a direction perpendicular to the central axis O1 is defined as R (m), X is an integer that is 2πR or less and is closest to 2πR.

In the case in which a plurality of opening portions 116 are formed, the opening portions 116 are preferably disposed at equal intervals around the central axis O1 of the tower 110.

In the present embodiment, a tubular upper tubular portion 122 that rises upward to surround the upper portion of the tower 110 is provided at a circumferential end portion of an opening portion in the bottom portion 121 of the nacelle 120, into which the tower 110 is fitted. Thus, for example, even if oil leaks from devices in the hub 130 or nacelle 120, when an amount of leakage is small, the oil leaked from the devices is blocked by the upper tubular portion 122 and inhibited from flowing out of the nacelle 120.

Further, a tubular lower tubular portion 123 that hangs down to surround the tower 110 is provided at the circumferential end portion of the opening portion in the bottom portion 121 of the nacelle 120, into which the tower 110 is fitted. A lower end 123a of the lower tubular portion 123 is located below an upper end 114a of the side wall portion 114 of the oil receiving portion 112, and the lower tubular portion 123 is in a state in which it is inserted into the side wall portion 114 of the oil receiving portion 112. The lower end 123a of the lower tubular portion 123 and the upper surface 113a of the protruding portion 113 of the oil receiving portion 112 are separated from each other.

As described above, the lower tubular portion 123 inserted into the side wall portion 114 of the oil receiving portion 112 is provided, and thus even if the oil in the nacelle 120 flows out from the gap 115 between the tower 110 and the nacelle 120, the oil is less likely to be scattered by wind. For that reason, the oil can be guided into the tower 110 more stably.

As shown in FIG. 2, in the vertical direction, a distance between the upper end 114a of the side wall portion 114 of the oil receiving portion 112 and the lower end 123a of the lower tubular portion 123 is defined as A (m), and a distance between a bottom surface 120a of the bottom portion 121 of the nacelle 120 and the lower end 123a of the lower tubular portion 123 is defined as B (m). In this case, a ratio of A to B can be set to, for example, 20% or more and 80% or less.

In the portion in which the lower tubular portion 123 is inserted into the side wall portion 114 of the oil receiving portion 112, a space between the lower tubular portion 123 and the side wall portion 114 is sealed with a sealing material 150 over the entire circumference thereof. Thus, even if the oil in the nacelle 120 flows out from the gap 115 between the tower 110 and the nacelle and 120, outflow of the oil to the outside of the generation system can be more stably inhibited.

The sealing material 150 is not particularly limited and, for example, a packing, silicon rubber, or the like can be exemplified.

Second Embodiment

Figure 5:
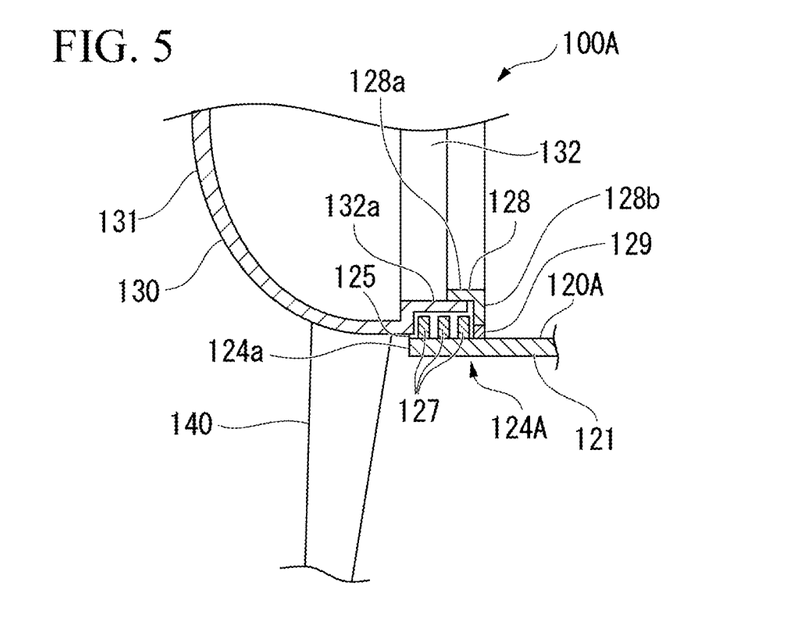
FIG. 5 is an enlarged cross-sectional view of a connection portion between a hub and a nacelle according to another embodiment of the present invention.

A wind energy generation system 100A of a second embodiment illustrated in FIG. 5 includes the tower 110, a nacelle 120A, the hub 130, and the one or more blades 140. The wind energy generation system 100A is the same aspect as the wind energy generation system 100 except that it includes the nacelle 120A provided with a fitting portion 124A on a front side thereof instead of the nacelle 120. The same portions as those in FIG. 3 in FIG. 5 will be denoted by the same reference numerals, and a description thereof will be omitted.

In the fitting portion 124A, the inclined portion 126 is not formed, and weir portions 127 formed in protrusion shapes, which rise from the tip portion 124a of the bottom portion 121 of the nacelle 120A and extend in a circumferential direction of the opening portion 125, are provided. A plurality of weir portions 127 are provided at the lower tip portion 124a at intervals from the front to the rear. Also in the wind energy generation system 100A, the fitting protruding portion 132 of the hub 130 is fitted into the fitting portion 124A from the opening portion 125 of the nacelle 120A, and thus the hub 130 is rotatably connected to a front side of the nacelle 120A.

In the wind energy generation system 100A, similarly to the wind energy generation system 100, the fitting protruding portion 132 of the hub 130 is configured to be fitted into the fitting portion 124A of the nacelle 120A, and thus in a lower portion of a connection portion between the nacelle 120A and the hub 130, the tip portion 132a of the fitting protruding portion 132 is located above the tip portion 124a of the fitting portion 124A. Thus, even if oil leaks from the devices in the hub 130, the oil flows through the fitting protruding portion 132 into the nacelle 120A, and thus outflow of the oil from the gap between the hub 130 and the nacelle 120A is inhibited.

Further, in this example, since a labyrinth structure in which the plurality of weir portions 127 are provided between the tip portion 124a of the fitting portion 124A and the fitting protruding portion 132 of the hub 130 on the bottom portion 121 side of the fitting portion 124A of the nacelle 120A is adopted, the oil that has flowed from the hub 130 into the nacelle 120A is inhibited from flowing to the opening portion 125 by the weir portions 127. For that reason, outflow of the oil from the gap between the hub 130 and the nacelle 120A can be more stably inhibited.

The number of weir portions 127 provided in the fitting portion 124A of the nacelle 120A is not limited to three. The number of weir portions 127 may be, for example, 1 or more and 10 or less.

A length of the weir portion 127 in the circumferential direction of the opening portion 125 may be appropriately set within a range in which outflow of the oil can be inhibited and can be set to, for example, 5 mm or more and 30 mm or less.

A height of the weir portion 127 may be appropriately set within a range in which outflow of the oil can be inhibited and can be set to, for example, 20 mm or more and 100 mm or less.

In the wind energy generation system 100A, a cylindrical fitting member 128 is provided inside the fitting portion 124A of the nacelle 120A. The fitting member 128 includes a tubular portion 128a that is fitted into the tip portion 132a of the fitting protruding portion 132 of the hub 130, and a flange portion 128b that protrudes outward from a rear end of the tubular portion 128a. A space between an outer tip of the flange portion 128b and an inner wall surface of the nacelle 120A is sealed with a sealing material 129.

A material of the fitting member 128 is not particularly limited and, for example, the same material as that of the hub 130 can be exemplified.

The sealing material 129 is not particularly limited and, for example, the same material as that illustrated in the sealing material 150 can be exemplified.

In the wind energy generation system 100A, the tubular portion 128a of the fitting member 128 is fitted into the tip portion 132a of the fitting protruding portion 132 of the hub 130 fitted to the fitting portion 124A, and the hub 130 rotates while they slide. Thus, when the oil leaks from the devices in the hub 130, outflow of the oil from the gap between the hub 130 and the nacelle 120A can be more stably inhibited.

Third Embodiment

Figure 6:
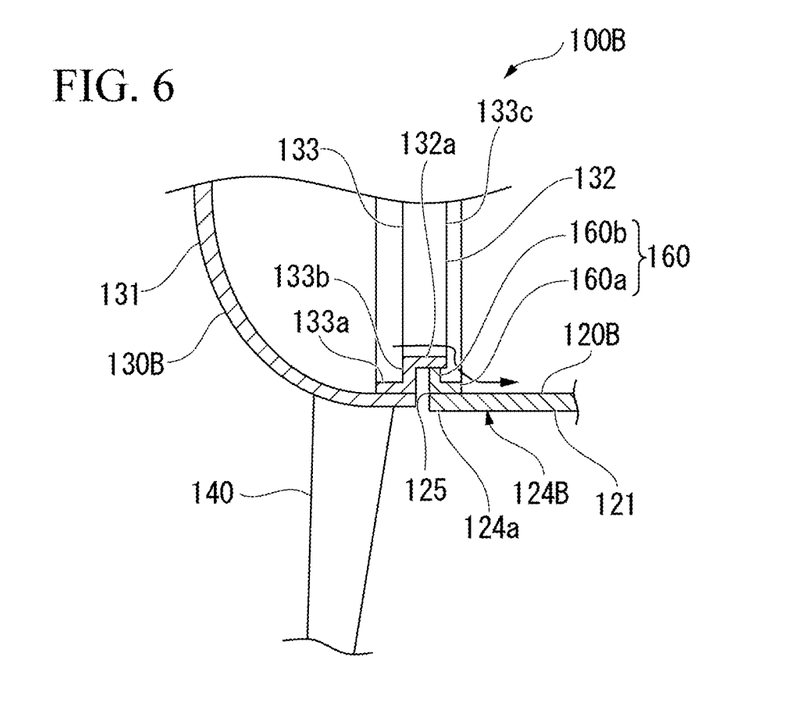
FIG. 6 is an enlarged cross-sectional view of a connection portion between a hub and a nacelle according to another embodiment of the present invention.

A wind energy generation system 100B of a third embodiment illustrated in FIG. 6 is the same aspect as the wind energy generation system 100 except that it includes a hub 130B and a nacelle 120B provided with a fitting portion 124B on a front side thereof instead of the hub 130 and the nacelle 120. In the fitting portion 124B, the inclined portion 126 is not formed. The same portions as those in FIG. 3 in FIG. 6 will be denoted by the same reference numerals, and a description thereof will be omitted.

In the hub 130B, a cylindrical hub fitting member 133 is fitted to the back surface side of the hub body portion 131. The hub fitting member 133 includes a hub-side cylinder portion 133a, an annular portion 133b, and a nacelle-side cylinder portion 133c. The hub-side cylinder portion 133a is a cylindrical portion fitted to the back surface side of the hub body portion 131. The annular portion 133b is an annular portion that protrudes inward from an end portion of the hub-side cylinder portion 133a on the back surface side of the hub body portion 131. The nacelle-side cylinder portion 133c is a cylindrical portion that is provided on a side opposite to the hub-side cylinder portion 133a from an inner end portion of the annular portion 133b and fitted into the fitting portion 124B of the nacelle 120B.

In the hub 130B, the fitting protruding portion 132 is formed by the hub fitting member 133 fitted to the back surface side of the hub body portion 131.

A cylindrical nacelle fitting member 160 is fitted into the fitting portion 124B of the nacelle 120B along the opening portion 125. The nacelle fitting member 160 includes a cylinder portion 160a fitted into the fitting portion 124B and an annular protruding portion 160b that protrudes inward from an end portion of the cylinder portion 160a on the opening portion 125 side.

Materials of the hub fitting member 133 and the nacelle fitting member 160 are not particularly limited and, for example, the same material as the hub 130 can be exemplified.

In the wind energy generation system 100B, while the hub fitting member 133 is attached to the back surface side of the hub body portion 131 and the nacelle fitting member 160 is attached to the fitting portion 124B of the nacelle 120B, the fitting protruding portion 132 of the hub 130B is fitted into the fitting portion 124B from the opening portion 125 of the nacelle 120B. The nacelle-side cylinder portion 133c of the hub fitting member 133 is inserted into the protruding portion 160b of the nacelle fitting member 160. Thus, the hub 130B is rotatably connected to a front side of the nacelle 120B.

In the wind energy generation system 100B, similarly to the wind energy generation system 100, the fitting protruding portion 132 of the hub 130B is configured to be fitted into the fitting portion 124B of the nacelle 120B, and thus in a lower portion of a connection portion between the nacelle 120B and the hub 130B, the tip portion 132a of the fitting protruding portion 132 is located above the tip portion 124a of the fitting portion 124B. Thus, for example, even if the oil leaks from the devices in the hub 130B, the oil flows through the fitting protruding portion 132 into the nacelle 120B, and thus outflow of the oil from the gap between the hub 130B and the nacelle 120A is inhibited. Further, in this example, the protruding portion 160b of the nacelle fitting member 160 attached to the fitting portion 124B of the nacelle 120B serves as a weir, and thus the oil that has flowed into the nacelle 120B from the hub 130B can be more stably inhibited from flowing out from the opening portion 125.

The aspect using the hub fitting member 133 and the nacelle fitting member 160, such as the wind energy generation system 100B, is advantageous in that it can also be applied to an existing wind energy generation system. By attaching the hub fitting member 133 and the nacelle fitting member 160 to the hub and nacelle of the existing wind energy generation system, it is possible to inhibit oil leakage from the gap between the hub and the nacelle in the existing wind energy generation system. In a case in which it is applied to an existing wind energy generation system, the hub fitting member 133 and the nacelle fitting member 160 are each configured of a plurality of parts. Thus, by carrying parts into the hub and nacelle through the tower and assembling them in the hub and the nacelle, the hub fitting member 133 and the nacelle fitting member 160 can be installed in the existing wind energy generation system.

As described above, the wind energy generation system of the present invention has a structure in which the fitting protruding portion provided on the back surface side of the hub is fitted into the fitting portion from the opening portion in front of the nacelle. Thus, even if the oil leaks from the devices in the hub, the oil flows to the inside of the nacelle through the fitting protruding portion of the hub, and thus outflow of the oil from the gap between the hub and the nacelle can be sufficiently inhibited. In this way, in the present invention, even if operating oil for hydraulic operation of blades, lubricating oil for speed increasers, insulating oil of oil-immersed transformers, or the like leaks, outflow of the oil to the outside of the generation system is inhibited.

Since the wind energy generation system of the present invention can sufficiently inhibit the outflow of the oil to the outside of the generation system, it can be particularly suitably used for offshore wind power generation.

Also, the technical scope of the present invention is not limited to the above-described embodiments and various changes can be made without departing from the spirit of the present invention.

For example, the wind energy generation system 100A may be a wind energy generation system in which the fitting member 128 and the sealing material 129 are not provided.

In the wind energy generation systems 100, 100A, and 100B, the space between the lower tubular portion 123 and the side wall portion 114 may not be sealed with the sealing material 150. One or both of the upper tubular portion 122 and the lower tubular portion 123 may not be provided at the circumferential end portion of the opening portion in the bottom portion 121 of the nacelle 120, into which the tower 110 is fitted.

Figure 7:
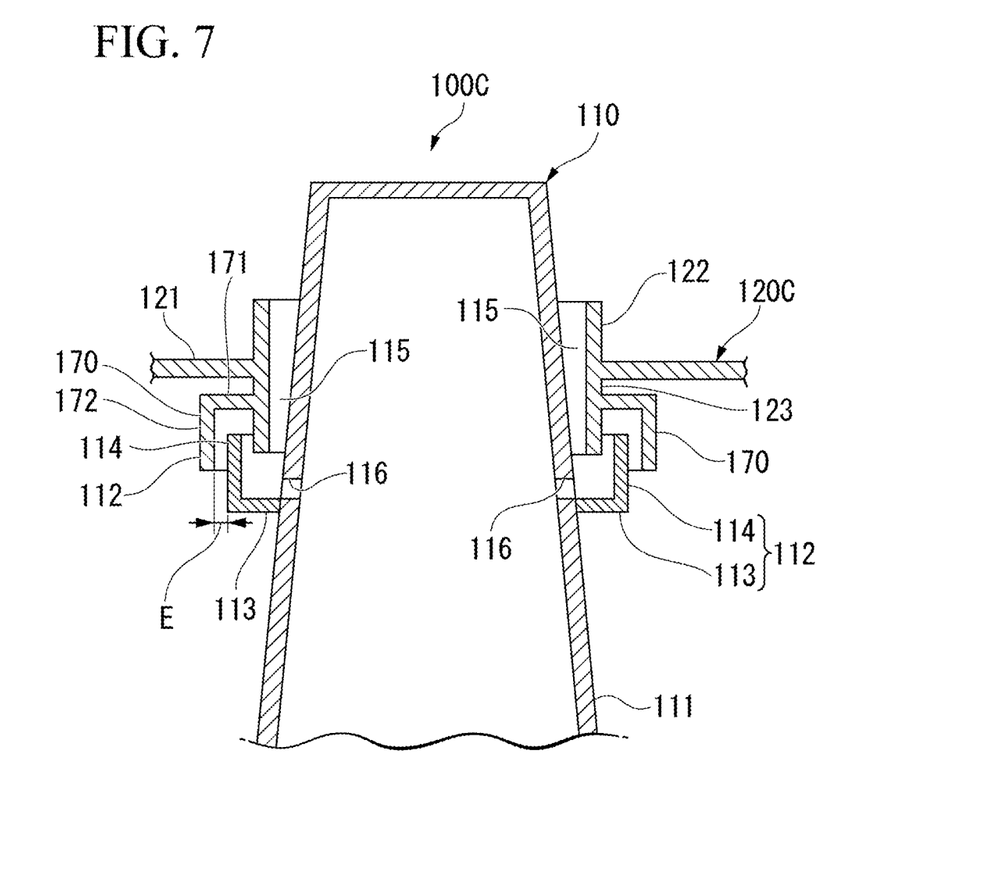
FIG. 7 is an enlarged cross-sectional view of the vicinity of a connection portion between a tower and a nacelle of another example of the wind energy generation system of the present invention.

The wind energy generation system of the present invention may be a wind energy generation system 100C illustrated in FIG. 7. The same portions as those in FIG. 2 in FIG. 7 will be denoted by the same reference numerals, and the description thereof will be omitted.

The wind energy generation system 100C is the same aspect as the wind energy generation system 100 except that it includes a nacelle 120C instead of the nacelle 120 and a space between the lower tubular portion 123 and the side wall portion 114 is not sealed with the sealing material 150.

The nacelle 120C is the same aspect as the nacelle 120 except that it further includes an oil receiving cover 170. The oil receiving cover 170 includes an annular upper protruding portion 171 that protrudes from an outer surface of the lower tubular portion 123 above the oil receiving portion 112 over the entire circumference thereof, and a cylindrical tubular portion 172 that hangs down from an outer circumferential edge of the upper protruding portion 171 and is provided to cover an outer side of the side wall portion 114 of the oil receiving portion 112.

By providing the oil receiving cover 170, even if the space between the lower tubular portion 123 and the side wall portion 114 is not sealed with the sealing material 150, it is easy to inhibit foreign matter from entering the oil receiving portion 112 from the outside and clogging the opening portion 116. For that reason, it is not necessary to perform maintenance of the oil receiving portion 112 on a regular basis, which facilitates operations of the wind energy generation system 100C. Further, by providing the oil receiving cover 170, it is also easy to inhibit the oil received by the oil receiving portion 112 from being scattered by wind.

The cylinder portion 172 of the oil receiving cover 170 and the side wall portion 114 of the oil receiving portion 112 are preferably separated from each other. A distance E of a gap between the cylinder portion 172 of the oil receiving cover 170 and the side wall portion 114 of the oil receiving portion 112 may be set not to come into contact with each other due to deformation or vibration of the nacelle 120C or the tower 110 during operation within a range in which foreign matter from the outside can be inhibited.

In addition, it is possible to appropriately replace the constituent elements in the embodiment with well-known constituent elements without departing from the spirit of the present invention, and the above-mentioned modified examples may be appropriately combined with each other.

REFERENCE SIGNS LIST 100, 100A to 100C Wind energy generation system
110 Tower
111 Outer wall
112 Oil receiving portion
113 Protruding portion
114 Side wall portion
115 Gap
116 Opening portion
120, 120A to 120C Nacelle
121 Bottom portion
122 Upper tubular portion
123 Lower tubular portion
124, 124A Fitting portion
124a Tip portion
125 Opening portion
126 Inclined portion
127 Weir portion
128 Fitting member
130, 130B Hub
131 Hub body portion
132 Fitting protruding portion
132a Tip portion
133 Hub fitting member
140 Blade
160 Nacelle fitting member
170 Oil receiving cover
O1 Central axis

What is claimed is:

1. A wind energy generation system comprising:
a tower;
a nacelle provided in an upper portion of the tower to be rotatable around a central axis of the tower;
a hub provided in front of the nacelle to be rotatable around an axis orthogonal to the central axis;
one or more blades provided in the hub, wherein the hub includes a hub body portion to which the blades are attached,
a fitting protruding portion that protrudes from a back surface side of the hub body portion,
a fitting portion having an opening portion is provided in front of the nacelle, and
the fitting protruding portion is fitted into the fitting portion from the opening portion,
wherein the fitting portion in a bottom portion of the nacelle includes a tip portion that extends horizontally from the opening portion to the back surface side, and an inclined portion that extends from a rear end of the tip portion and has a height lower than the tip portion, and a boundary between the tip portion and the inclined portion is located closer to the hub body portion side than a tip of the fitting protruding portion on the back surface side.

2. The wind energy generation system according to claim 1, wherein an inclined portion whose height decreases as it separates from the opening portion is provided near a tip portion of the fitting portion in the bottom portion of the nacelle.

3. A wind energy generation system comprising:
a tower;
a nacelle provided in an upper portion of the tower to be rotatable around a central axis of the tower;
a hub provided in front of the nacelle to be rotatable around an axis orthogonal to the central axis;
one or more blades provided in the hub, wherein the hub includes a hub body portion to which the blades are attached,
a fitting protruding portion that protrudes from a back surface side of the hub body portion,
a fitting portion having an opening portion is provided in front of the nacelle, and
the fitting protruding portion is fitted into the fitting portion from the opening portion, and
one or more weir portions formed in protrusion shapes, which rise from a tip portion of the fitting portion in a bottom portion of the nacelle and extend in a circumferential direction of the opening portion are provided in the fitting portion.

4. A wind energy generation system comprising:
a tower;
a nacelle provided in an upper portion of the tower to be rotatable around a central axis of the tower;
a hub provided in front of the nacelle to be rotatable around an axis orthogonal to the central axis;
one or more blades provided in the hub, wherein the hub includes a hub body portion to which the blades are attached,
a fitting protruding portion that protrudes from a back surface side of the hub body portion,
a fitting portion having an opening portion is provided in front of the nacelle, and
the fitting protruding portion is fitted into the fitting portion from the opening portion,
a cylindrical hub fitting member is fitted to the back surface side of the hub body portion to form the fitting protruding portion,
a cylindrical nacelle fitting member is fitted into the fitting portion along the opening portion,
wherein the fitting protruding portion fitted into the fitting portion from the opening portion is inserted into the nacelle fitting member.

* * * * *